Sept 8, 1925.
G. G. HEROLD
OIL PUMP
Filed March 6, 1922
1,553,079
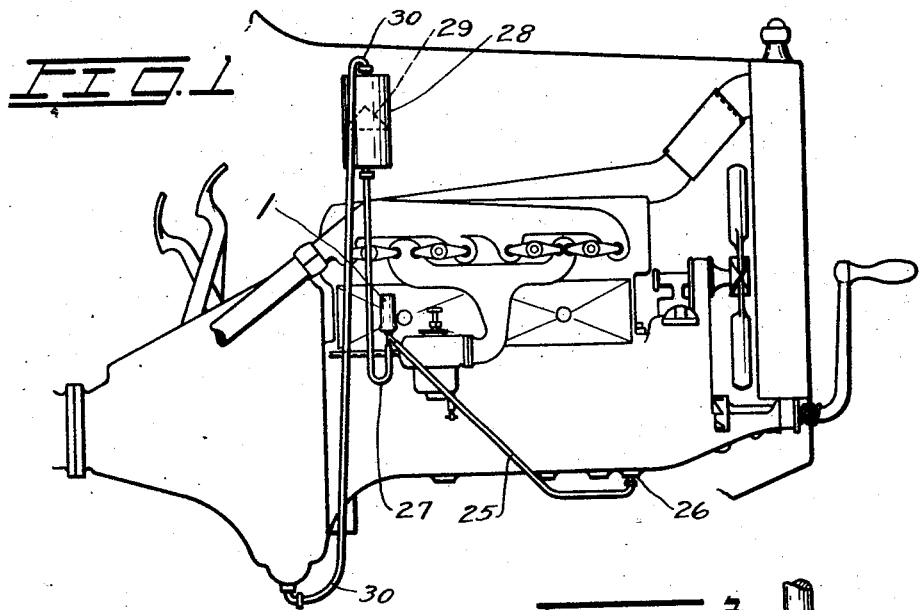
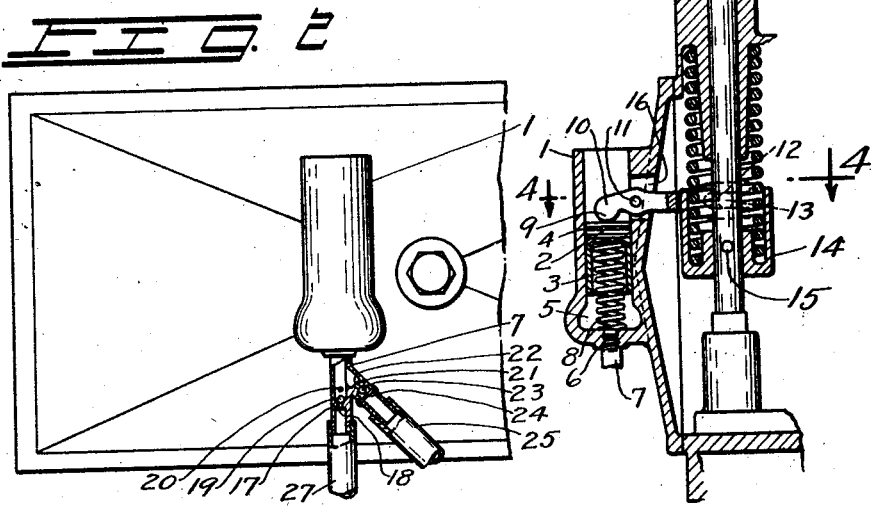
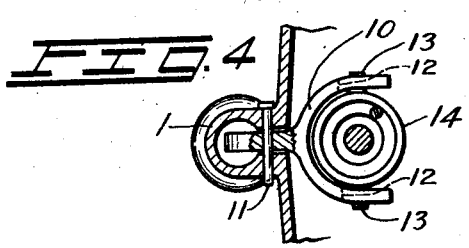
INVENTOR
George G. Herold
BY
Harry Bowen
ATTORNEY Patented Sept. 8, 1925.

1,553,079

UNITED STATES PATENT OFFICE.

GEORGE G. HEROLD, OF SEATTLE, WASHINGTON, ASSIGNOR OF ONE-FIFTH TO FLOYD SLANE, OF SEATTLE, WASHINGTON.

OIL PUMP.

Application filed March 6, 1922. Serial No. 541,617.

*To all whom it may concern:*

Be it known that I, GEORGE G. HEROLD, a citizen of the United States, residing at Seattle, county of King, and State of Washington, have invented a new and useful Oil Pump; and I do hereby declare that the following is a full, clear, and exact specification, such as will enable others skilled in the art to which it appertains to make and use the same.

The invention is a device for circulating oil thru an automobile engine and transmission casing which may be operated from one of the valve stems.

The object of the invention is to provide a device which may be attached to an automobile and operated from one of the valve stems that will circulate the oil thru the engine and transmission housings.

Another object of the invention is to construct a small pump in one of the cover plates on the side of the engine of an automobile which may be operated from one of the valve stems.

And a further object of the invention is to provide an oil pump for circulating oil thru the housing of an automobile engine and transmission that may be operated from one of the valve stems which has a strainer attached to it for straining the oil.

With these ends in view the invention embodies a cylindrical casing attached to the side cover plate of an automobile engine having a piston in it with a spring under it and a lever arm pivoted at the side of the cylinder one end of which rests upon the top of the piston and the other end of which has slotted holes in it to fit over pins on the side of the valve stem. It also embodies a tank with a strainer in it and a pipe connection from the tank to the lowest point of the engine and transmission housing, another pipe from the tank to the bottom of the cylindrical casing with a check valve in it and another pipe from the bottom of the cylindrical casing to a point in the engine housing which also has a check valve in it.

Other features and advantages of the invention will appear from the following description taken in connection with the drawings, wherein:—

Figure 1 is a side elevation of an automobile engine with parts removed.

Figure 2 is a side elevation of the cover plate with a cylindrical casing attached showing part of the pipes broken away.

Figure 3 is a part cross section on the center line of the pump.

Figure 4 is a cross section on line 4—4 of Figure 3.

In the drawings I have shown my device as it would be installed wherein numeral 1 indicates the cylinder in which is a piston 2 having an opening 3 in it and grooves 4 around its outer surface. The lower end of the casing 1 is bulged outward to form an enlarged portion 5 and has a hole 6 into which a pipe 7 may be screwed. A spring 8 rests on the bottom of the cylinder and projects upward into the opening 3 in the piston 2 which holds the piston up against the lower edge of the knobbed end 9 of the lever 10. This lever is pivoted on a pin 11 and its opposite end is forked as shown in Figure 4 with slots 12 in the ends of the forks which fit over pins 13 on the outside of the cup shaped casing 14. The casing 14 is constructed as shown in Figure 3 so as to form a seat for the spring on the valve stem and is held to the stem by the pin 15. The cylinder 1 may be constructed as shown by being embodied in the casting of the cover plate and having a slot 16 thru which the lever 10 operates, or it may be constructed by using a separate casting and attaching it to the cover plate.

The pipe or fitting 7 which is screwed into the bottom of the cylinder is constructed in the shape of a Y as shown in Figure 2 and has a seat 17 in one branch with a hole 18 in its center and a ball 19 above the hole which forms a ball check valve and will not permit oil to flow downward in it. Just above the ball is a pin 20 which passes thru the fitting and will not permit the ball to move upward more than the distance necessary to open the valve. In the other branch is a seat 21 with a hole 22 in it and a ball 23 below it which forms another ball check valve to prevent oil from flowing upward thru this branch and just below the ball is a pin 24 which prevents the ball dropping away from the valve more than enough to open it. On this branch of the fitting 7 is a pipe 25 which connects it to a point 26 in the engine housing and to the opposite branch of the fitting 7 a pipe 27 is connected the opposite end of which is connected to one end of a small tank 28. This tank has a strainer 29 in it and its opposite end is connected thru a pipe 30 to the lowest point of the engine and transmission housing.

It will be understood that changes in the construction can be made without departing from the spirit of the invention. One of which changes may be in the use of a different method for connecting the end of the lever 10 to the valve stem, another change may be in the location of the tank 28 or in its ommission altogether, and another change may be in the use of check valves of a different design.

The construction will be readily understood from the foregoing description. To use the device it should be installed as shown in Figure 1 and as the engine starts in motion the pin 13 will move the end of the lever 10 upward and downward which will cause the opposite end 9 to push the piston 2 downward and upward. The spring 8 will cause the piston to follow the end 9 of the lever 10 upward during each stroke and as it moves upward it will draw oil thru the pipe 27, the tank 28 and the pipe 30 from the bottom of the housing. Then as the piston moves downward it will close the valve in which is the ball 19 and open the valve in which is the ball 23 so as to permit the oil to pass thru the pipe 25 and into the forward end of the housing.

Having thus fully described the invention, what I claim as new and desire to secure by Letters Patent is:—

A device of the type described comprising a cylinder; a piston in the cylinder; a spring between the piston and one end of the cylinder; rings around the piston; a lever pivoted in the side of the cylinder having a knob on one end bearing against one end of the piston a fork on the opposite end having slots in its ends; a valve stem having a casing on it which forms a seat for the valve spring; said casing having pins on its sides to fit in the slots of the fork; and a Y fitting with a check valve to permit liquid to flow in one direction in one branch and another check valve in the other branch which will permit liquid to flow in the opposite direction, fastened to the bottom of the cylinder.

GEORGE G. HEROLD.